May 20, 1947.  W. H. FORMHALS ET AL  2,420,873
"RECTOX" MOTOR CONTROL SYSTEM
Filed July 3, 1943  2 Sheets-Sheet 1

WITNESSES:
Robert C. Baird
Nw. C. Groome

INVENTORS.
William H. Formhals and
Scott H. Hanville, Jr.
BY
Paul E. Friedemann
ATTORNEY May 20, 1947.　　W. H. FORMHALS ET AL　　2,420,873
"RECTOX" MOTOR CONTROL SYSTEM
Filed July 3, 1943　　2 Sheets-Sheet 2

WITNESSES:
Robert C. Baird
Nw. C. Groome

INVENTORS.
William H. Formhals and
Scott H. Hanville, Jr.
BY
Paul E. Friedemann
ATTORNEY Patented May 20, 1947

2,420,873

UNITED STATES PATENT OFFICE 2,420,873

"RECTOX" MOTOR CONTROL SYSTEM

William H. Formhals, Forest Hills, Pa., and Scott H. Hanville, Jr., Huron, Ohio, assignors to Westinghouse Electric Corporation, East Pittsburgh, Pa., a corporation of Pennsylvania Application July 3, 1943, Serial No. 493,328

3 Claims. (Cl. 172—239)

1

Our invention relates to electric control systems and more particularly to systems for controlling the excitation of a direct current motor connected to a direct current generator.

A broad object of our invention is to maintain the excitation of a series field of a direct current motor in the same direction when the armature current of the motor is reversed.

Another object of our invention is the provision of automatic means for energizing the series field of a direct current motor in the same direction and proportional to the motor armature current regardless of the direction of the armature current.

It is also an object of our invention to provide for automatic dynamic braking of a series motor connected to a series generator, in a series variable voltage drive, without the use of reversing contactors for the motor series field.

A still further object of our invention is the provision of means for maintaining the excitation of the series field of a direct current motor in the same direction regardless of whether the motor is operating normally in either direction by a reversal of the polarity of voltage supplied to it or whether the motor is dynamically braked or regeneratively braked after normal operation.

Other objects and advantages will become more apparent from a study of the following specification and the drawings accompanying the specification, in which drawings.

Figure 1:
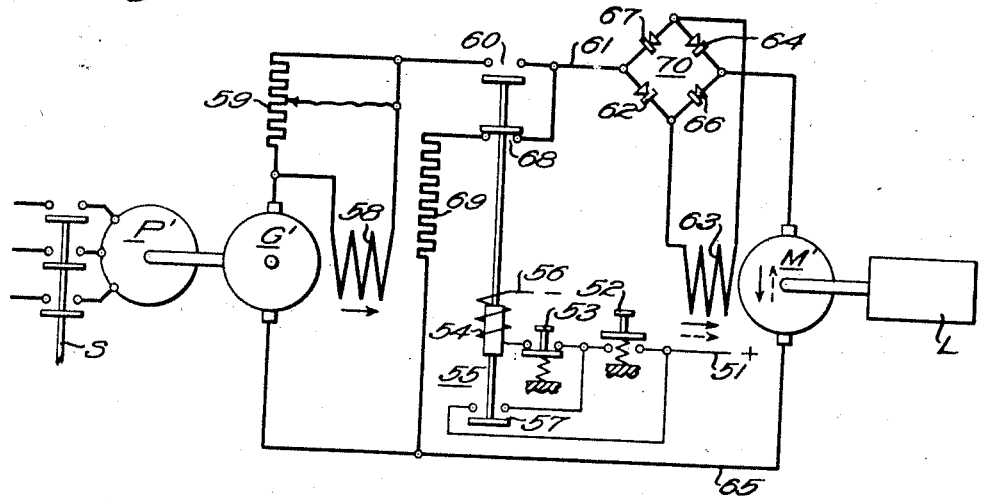
Figure 1 is a diagrammatic showing of our invention in its simplest form as applied to a series variable voltage drive.

In Fig. 1, P' designates the prime mover, as a constant speed induction motor, operating the series generator G'. This series generator has a series field 58 and the voltage of this generator is adjusted by the adjustable rheostat 59.

To start the drive switch S is closed and then push-button switch 52 is closed. These operations effect the operation of the generator G' at the desired speed and a circuit is established from bus 51 through starting switch 52, stop switch 53, coil 54 of the dynamic braking contactor 55 to bus 56. This contactor establishes its own holding circuit through contact members 57, and by the closure of contact members 60 connects the

2 series generator G' to the series motor M', which motor is coupled to drive a suitable load.

The loop circuit for the generator and motor may be traced from the generator armature through the generator series field 58, the excitation of which is adjusted by the rheostat 59, contact members 60, lead 61, "Rectox" unit 62 of the full wave rectifier 70, the motor series field 63, acting in the direction indicated by the full-line arrow adjacent this field 63, "Rectox" unit 64 of the full-wave rectifier 70, the armature of motor M', and lead 65 back to the generator armature.

If the motor M' is to be stopped, stop switch 53 is actuated to thus effect the deenergization of coil 54 of the dynamic braking contactor. This contactor thus closes the contact members 68 to connect the dynamic braking resistor 69 to the motor M'. The braking circuit may be traced from the upper terminals of the armature of the motor M', through "Rectox" unit 66 of the rectifier 70, the motor series field winding 63, energized in the same direction by the counter-electromotive force of motor M' as during normal operation, "Rectox" unit 67, lead 61, back contact members 68 of contactor 55, dynamic braking resistor 69 and lead 65 back to the armature of the motor M'.

It should be noted that dynamic braking is accomplished automatically with maximum braking effect with the use of but a single dynamic braking contactor. To accomplish some similar results with the prior art schemes two or more contactors are needed, as a mere inspection of Fig. 2 will show.

It frequently happens that the characteristics required of a conventional direct current motor necessitate the use of a series field. This requirement in many cases increases the duty of the control and thus results in a more expensive equipment.

Figure 2:
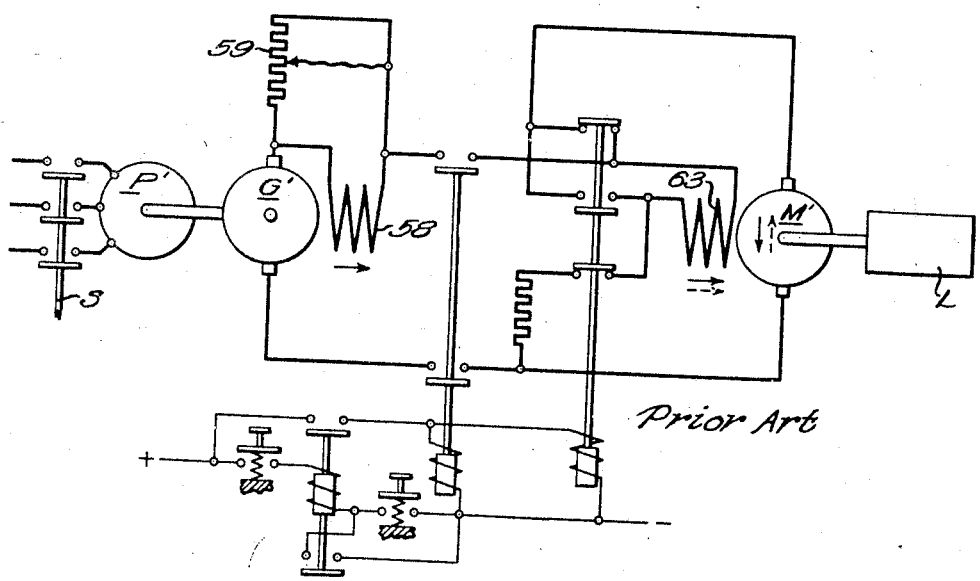
Fig. 2 is a simple diagrammatic showing of the minimum equipment required with a prior art series variable voltage drive.

In most prior art adjustable voltage drives of the Ward-Leonard type embodying motor reversal, it is customary to accomplish reversal of the motor by a reversal of the generator separately excited field, when the main field of the motor is separately excited in the same direction. In such a system the generator series field, if used, will always agree in polarity with the separately excited field as reversal of the generator voltage is accomplished by reversal of line current, thus reversing the series field effect with the reversal of the shunt field. This, however, is not true with the motor series field because the separately excited field is always excited with one polarity while the series field will reverse with reversal of line current. Since it is undesirable to have a differential series on a direct current motor, some provision must be made to reverse this series field. This is relatively expensive because the contactors for reversing the connections of the series field, as shown in Fig. 2, must handle full line current and thus are relatively large. Often relays must be used in addition to operate these contactors. Further, such prior art schemes permit the undesirable possibility of opening the circuit between the motor and generator thus making it possible to lose the regenerative braking feature of an adjustable voltage drive. For another typical prior art scheme reference may be had to the G. E. King Patent No. 1,805,248.

Our scheme of control provides all the benefits of the prior art control plus the advantage of automatic operation and the use of very much less equipment, and further the elimination of the possibility of an open circuit between the generator and the motor.

Figure 3:
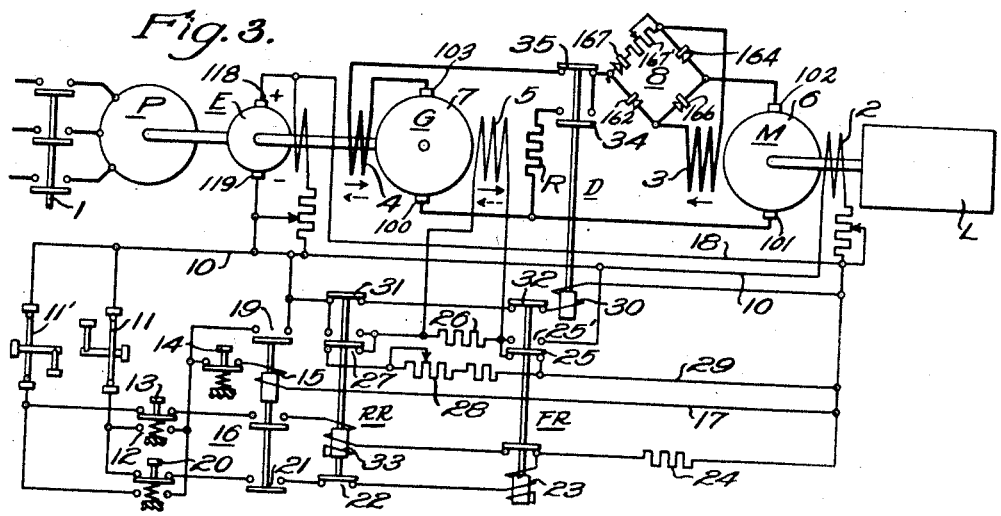
Fig. 3 is a diagrammatic showing of our invention as applied to a reversing control for a machine tool as a planer, draw-out shaper, or other machine.

In Fig. 3, P designates the prime mover operating at a constant speed to drive the exciter E and the main generator G. The prime mover may be, and as is usual in most industrial applications would be, an induction motor connected to a suitable source of alternating current by a circuit breaker 1.

A motor M is coupled to drive a load L. The motor M has a field winding 2 energized in the same direction and at constant value from the exciter E, which exciter is of the constant voltage type. The field 2 may, of course, be connected to the exciter E through suitable control so that the motor speed may be varied through excitation control. The motor M also has a series field 3.

The generator G has a series field 4 and a main field 5. The main field 5 is connected to the exciter E through suitable reversing control equipment for alterating the excitation of the field 5 and for reversing the connection of this field to the exciter. By this control equipment the magnitude of the generator voltage and its polarity may be effectively controlled.

The motor armature 6 is connected to the generator armature 7 by the permanent loop circuit including the generator armature 7, the motor armature 6, a portion of the rectifier 8, the motor series field 3, another portion of the rectifier 8, the generator series field 4 back to the generator armature.

The rectifier 8 is also of the full wave type with the motor series field winding being connected to the direct current junctions. With this connection the current through the motor series field winding 3 is always in the same direction, as shown by the arrow adjacent this series field, regardless of the direction of the current flow in the motor armature 6. Thus the series field 3 is always cumulative and the objections of the prior art schemes previously mentioned are removed. It is to be noted that the action is completely automatic and free from major discontinuities.

In Fig. 3 we show our invention in combination with dynamic braking in a reversing planer control. The load represents a planer platen, which platen, at the end of the one stroke operates the limit switch 11 and then at the end of the other stroke the other limit switch 11'.

A brief statement of the function of the system may aid in understanding the advantages of our control. If the attendant wishes to start the planer, say, in the forward direction, he depresses switch 13, whereupon a circuit is established from conductor 10, through limit switch 11, the lower contacts 12 of switch 13, stop switch 14, coil 15 of relay 16, and conductors 17 and 18 to the exciter.

Relay 16 closes contacts 19 to establish its own holding circuit.

Since switch 20 is in the position shown during this stage of operation a circuit is established from the positive terminal 118 of the exciter E through conductor 18, resistor 24, actuating coil 23 of the forward directional contactor FR, back contacts 22 of the reverse directional contactor RR, the closed contacts 21 of relay 16, the contacts of switch 20, the limit switch 11, and conductor 10 to the negative terminal of the exciter E.

Operation of the forward directional contactor establishes a circuit from the positive terminal 118 of the exciter E through conductor 18, the rheostat 28, contacts 27, the generator field winding 5 and the resistor 26 connected in parallel to this field winding 5, contacts 25', and conductor 10 to the negative terminal 119 of the exciter E. If this excitation of the field winding 5 is considered to be in the direction of the full-line arrow adjacent this field and the assumption is made that such excitation makes terminals 100 and 103 of the generator G positive and negative, respectively, then an energizing circuit is established for motor M. This circuit may be traced from the positive terminal 100 to terminal 101 of the motor M, the motor armature winding, terminal 102, rectifying unit 164 of the rectifier 8, field winding 3 of the motor M, rectifying unit 162, contacts 35, the series field winding 4 of the generator G to the negative terminal 103 of the generator G.

The generator series field winding 4 will be energized in the direction indicated by the full-line arrow adjacent this field and the series field 3 of the motor M will be energized in the direction indicated by the full-line arrow adjacent the field 3. Further, since the generator voltage impressed across the motor armature terminals is from terminal 101 to 102, the motor voltage, that is, the counter-electromotive force, is from terminal 102 toward 101. This means, assuming the motor excitation is not altered and it is operating as a generator, that terminal 101 is positive and terminal 102 is negative.

At the end of the forward stroke of the planer platen, comprising the load L, the limit switch 11 is opened. The actuating coil 23 for the forward directional contactor FR is thus deenergized and in consequence contacts 25' open in a predetermined relatively short time interval. At substantially the same time contacts 32 close whereupon a circuit is established from the positively energized conductor 18 through actuating coil 30 of the dynamic braking control contactor D, contacts 32 and 31 to the negatively energized conductor 10.

Operation of contactor D causes the closing of contacts 34 and the opening of contacts 35. Opening of contacts 35 disconnects the motor M from the generator G whereas the closing of contacts 34 connects the dynamic braking resistor R to the motor. The dynamic braking circuit may be traced from the positive terminal 101 of the motor, now operating as a generator, through resistor R, contacts 34, rectifying unit 167 of the rectifier 8, rheostat 167', series field 3 of the motor M, rectifying unit 166 of the rectifier 8, to the negative terminal of motor M. It will be noted that the series field 3 of the motor is energized in the same sense, namely, the sense designated by the full-line arrow adjacent the series field 3. The field strength is thus maintained as a function of the dynamic braking current and the braking torque as a function of the square of the braking current. Very effective braking is thus produced with the use of a single contactor D.

With prior art control schemes a minimum of four contact members, and often more, must be used to disconnect the motor from the generator, reverse the field, and apply the dynamic braking resistor.

With our scheme, only one contactor having two contact members is necessary thus making the control much cheaper. Further, much quicker and more positive braking is accomplished.

The specific circuits we show are illustrative of our invention and are not to be taken in a limiting sense. We, therefore, wish to be limited only by the scope of the claims hereto appended.

We claim as our invention:

1. In a variable speed drive for a motor, in combination, a generator having an armature winding and a series field winding, a motor similar to the generator, a loop circuit connecting the motor to the generator, said loop circuit including at least the generator and motor armatures, the generator series field, a full-wave rectifier having four legs each having current rectifying units and one leg having an impedance in addition to the current rectifying unit, said rectifier having one of its alternating current terminals connected to one motor armature terminal and the other connected in the loop circuit remote from said one motor armature terminal, and the motor series field winding connected to the direct current terminals of the full-wave rectifier.

2. In a variable speed drive for a direct current motor, in combination, a direct current generator having an armature winding and a series field winding, adjustable rheostatic means connected in parallel relation to the series field winding for controlling the current in the series field winding, a direct current motor having an armature winding and a series field winding, a loop circuit connecting the motor to the generator, said loop circuit including the armature windings of the generator and motor, the generator series field winding and its rheostatic means, the motor series field winding and a full-wave rectifier, said full-wave rectifier having four legs each including current rectifying means but one of the legs including an adjustable resistor in addition to the current rectifying means, the motor series field winding being connected across the direct current terminals of the full-wave rectifier.

3. In an adjustable speed drive for a load, in combination, a generator having a series field winding; means for driving the generator; a motor, coupled to the load to be driven, having a series field winding; a loop circuit connecting the motor to the generator; a full-wave rectifier having its alternating current terminals connected in the loop circuit; and having rectifying units in each of its four legs; a resistor in one of the legs of the rectifier for selectively controlling the speed of the motor in dependence of the polarity of the voltage applied to the motor armature terminals; a dynamic braking resistor; and switching means for disconnecting the generator from the motor and for connecting the dynamic braking resistor to the motor.

WILLIAM H. FORMHALS.
SCOTT H. HANVILLE, Jr.

REFERENCES CITED

The following references are of record in the file of this patent:

UNITED STATES PATENTS

| Number | Name | Date |
|---|---|---|
| 1,805,160 | Bivens | May 12, 1931 |
| 1,933,231 | Stevens | Oct. 31, 1933 |
| 865,819 | Powell | Sept. 10, 1907 |
| 1,955,334 | King | Apr. 17, 1934 |
| 2,298,188 | Wright | Oct. 6, 1942 |

FOREIGN PATENTS

| Number | Country | Date |
|---|---|---|
| 191,943 | Great Britain | Jan. 25, 1923 |
| 538,908 | Germany | Nov. 21, 1931 |